(No Model.) 3 Sheets—Sheet 2.
C. SCHULZ.
ROLLING MILL.
No. 327,728. Patented Oct. 6, 1885.
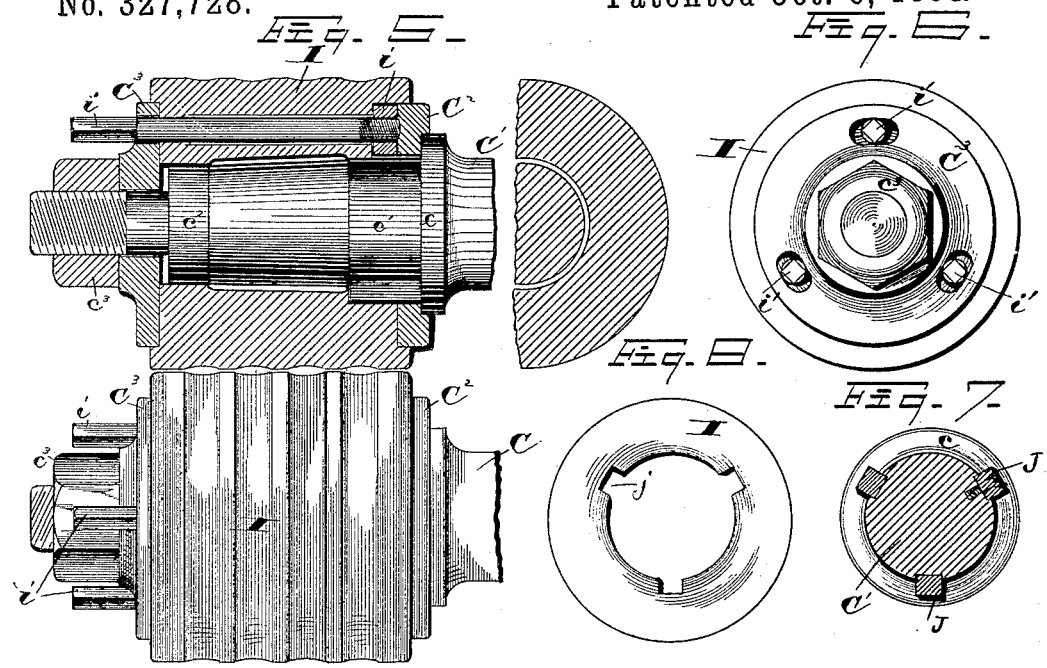
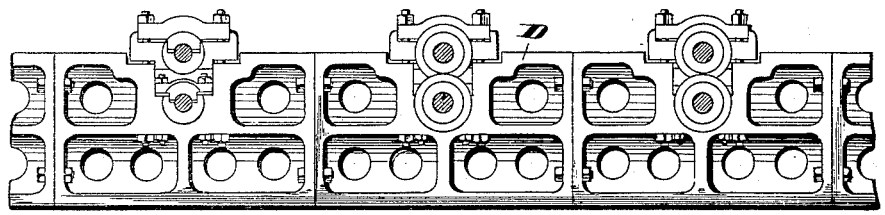
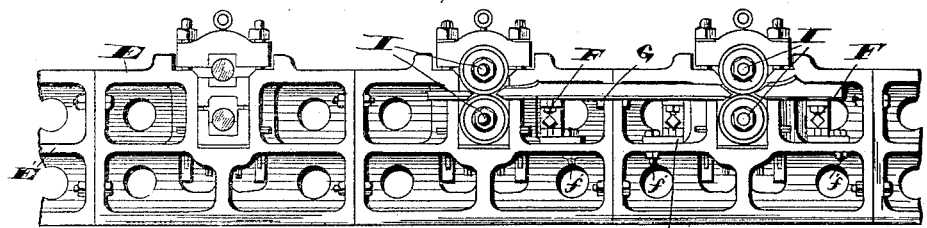
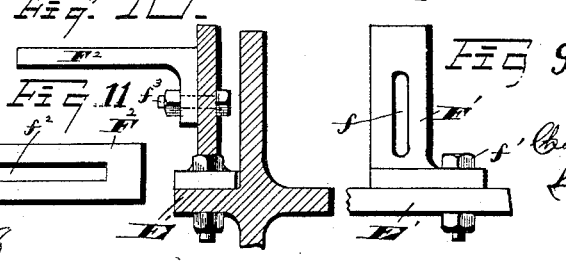
WITNESSES
Wm. A. Monroe
Geo. W. King
INVENTOR
Charles Schulz
by Leggett & Leggett
Attorneys (No Model.) 3 Sheets—Sheet 3.
C. SCHULZ.
ROLLING MILL.
No. 327,728. Patented Oct. 6, 1885.
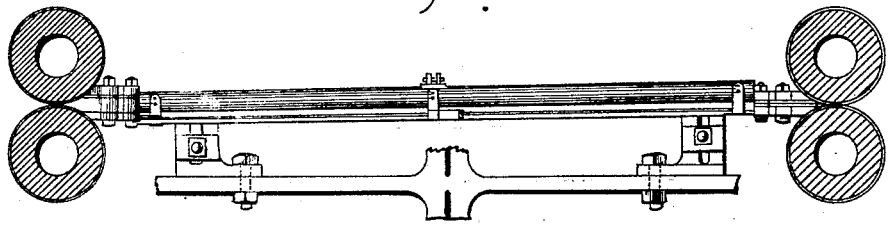
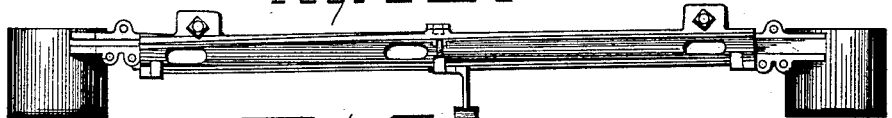
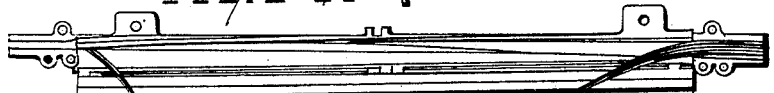
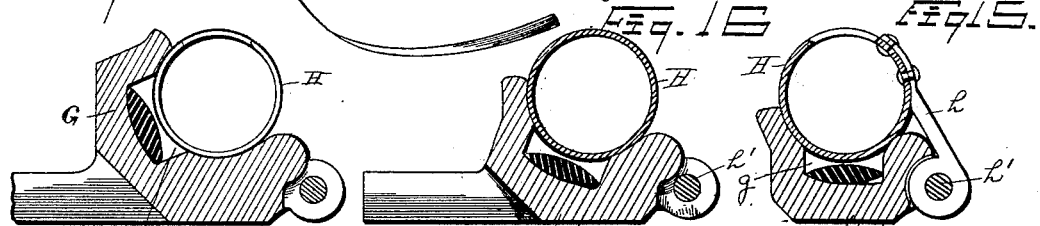
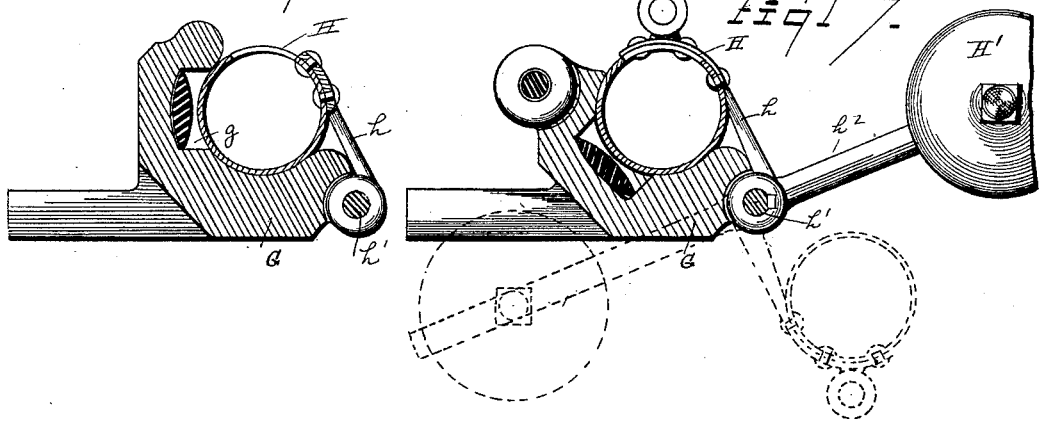
WITNESSES
Wm. H. Monroe.
Geo. W. King
INVENTOR
Charles Schulz.
Leggett & Leggett
Attorneys

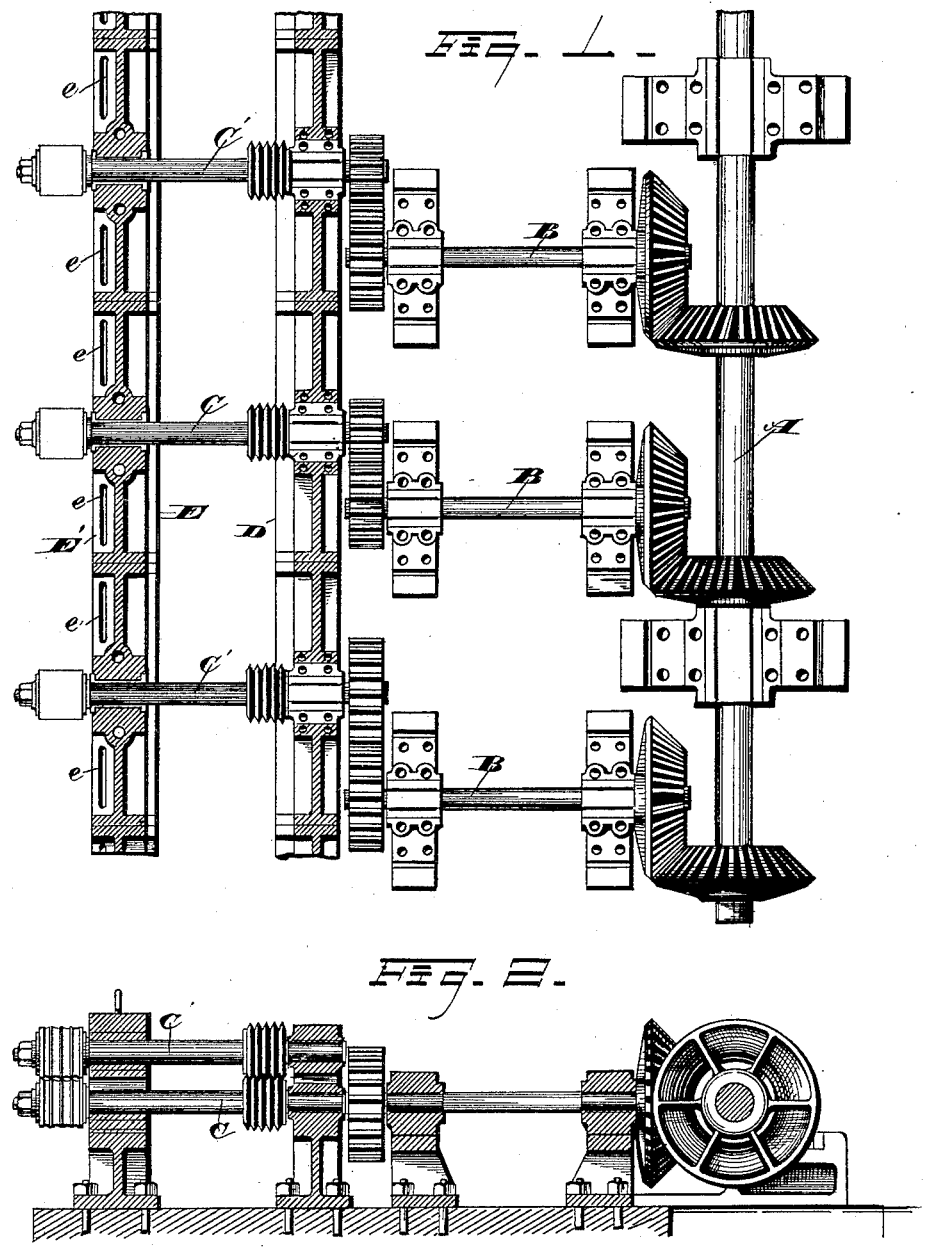

UNITED STATES PATENT OFFICE.

CHARLES SCHULZ, OF CLEVELAND, OHIO.

ROLLING-MILL.

SPECIFICATION forming part of Letters Patent No. 327,728, dated October 6, 1885.

Application filed May 7, 1885. Serial No. 164,675. (No model.)

*To all whom it may concern:*

Be it known that I, CHARLES SCHULZ, of Cleveland, in the county of Cuyahoga and State of Ohio, have invented certain new and useful Improvements in Rolling-Mill Plants; and I do hereby declare the following to be a full, clear, and exact description of the invention, such as will enable others skilled in the art to which it pertains to make and use the same.

My invention relates to improvements in rolling-mill plants, designed more especially for small work, the object being to provide a series of co-operating overhanging rollers set in pairs and in line, forming what is known as a "continuous train," and removably attached, respectively, to the shafts on which they are mounted, to the end that the rollers are easily removed for repairs or for changing the work.

A further object is to construct each roller and provide the same with suitable mechanism by means of which the rollers may be quickly and accurately adjusted lengthwise on the respective shafts, to the end that the grooves in the rollers of each pair may be made to register.

A further object is to provide adjustable expansion-guides to conduct the rods or bars being rolled from one set of rollers to the next adjacent set, and so arranged that the guides will expand or one portion will be opened by a pressure from within to allow loops to form in the rod or bar being wrought to compensate for the elongation of the metal between the rollers that may be had in excess of the receiving capacity of the following set of rollers. With these objects in view my invention consists in certain features of construction and in combination of parts, hereinafter described, and pointed out in the claims.

In the accompanying drawings, Figure 1 is a plan view of a rolling-mill plant embodying my invention. Fig. 2 is an end elevation of the same. Figs. 3 and 4 are side elevations, respectively, of the rear and front housing or frame-work for supporting the rollers and attachments. Fig. 5 is an enlarged side elevation of one set of rolls, the upper roll being in longitudinal section. Fig. 6 is an enlarged end elevation of one of the rollers in position. Fig. 7 is an end elevation, partly in section, of the shaft that supports the washers and rolls. Fig. 8 is an elevation of a washer. Fig. 9 is a side elevation of the upright portion of one of the brackets for supporting the guides, showing also a portion of the ledge of the frame on which the bracket rests. Fig. 10 is an end view in elevation of the bracket complete, a part of the frame and the upright portion of the bracket being in section. Fig. 11 is a plan view of the lateral arms of the bracket. Fig. 12 is a side elevation showing the brackets and guides in position. Fig. 13 is a plan view of the guiding apparatus closed. Fig. 14 is a plan view of the guiding apparatus opened, showing also a rod of metal in position, forming what is known as a "loop." Figs. from 15 to 19, inclusive, are elevations in transverse section of the guiding apparatus at different points, the latter showing in dotted lines the position of the guide open.

A represents the main driving-shaft, that is intergeared, as shown, with any number of intermediate shafts, B, that in turn are intergeared with the lower roller-shafts, C. These latter are intergeared with the upper roller-shafts, C', by friction-gears, as shown, or with spur-gears, if preferred.

The shafts C and C' are journaled in suitable boxes attached, respectively, to the frames D and E. These frames are of any desired length, according to the number of rollers employed, and are usually cast in sections and bolted together, as shown in Figs. 3 and 4.

The laterally-projecting ribs E' of the frame E have elongated holes $e$, for adjustably securing brackets F, supporting guides G, located between the rolls. The brackets consist of the upright part F' and the laterally-projecting arm F². The former is provided with the elongated hole $f$, and rests on the rib E', to which it is secured by the bolt $f'$, that, passing through the elongated hole $e$, renders the bracket adjustable lengthwise of the frame E. The arm F² has a slot, $f^2$, and is secured to the upright part F' by the bolt $f^3$, that passes through the elongated hole $f$, by means of which the arm F² is adjustable vertically. A bolt for securing the guides G to the bracket passes through the slot $f^2$, by means of which the guides are adjustable laterally toward or from the frame E, to bring them in line with the grooves of the reducing-rolls. The slot $f^2$ being open-ended, by loosening the bolts that secure the guides to the arm $F^2$, the guides may be removed without the trouble of removing such bolts; and as these guides have usually to be changed with every different form in the rod that is run through the rolls this construction is a great convenience.

A guide, G, is secured to arms $F^2$, and extends from one set of rollers to the next set, and guides the rods or bars in their passing between the sets of rolls. The guide has a longitudinal recess or channel, $g$, for receiving and guiding the rod or bar.

In order to quickly reduce a billet or bar to the required size and form, it is necessary to radically change the form of such billet or bar at each pass through the reducing-rollers.

If each succeeding set of rolls only reduced the billet or bar in size, but left it in the same form as the preceding rolls, a hard crust would be formed on the metal that would greatly retard the reduction of the same, by reason of which, if the reduction required was considerable, numerous passes through the rolls must be had, and quite likely the rod would require reheating before the reduction could be accomplished. On the other hand, if the shape of the bar in cross-section is radically changed with each pass through the rolls, the crust formed by one set of rolls is broken by the next succeeding set, and the reduction can be rapid.

In Fig. 15 a cross-section is shown of an elliptical bar in position as it comes from the rolls. This bar should be turned up endwise, in the position shown in Fig. 19, when it is delivered to the next set of rollers. To accomplish this the channel $g$ is made on a spiral similar to the grooves in a rifle-barrel, as illustrated in the different sections. (See Figs. 15 to 19, inclusive.) This spiral form of the channel $g$, if the guides are of considerable length, need not extend the entire length of the guides, especially for smaller bars or rods that are easily twisted. The spiral part in such case need only extend a few inches to give the required quarter-turn, and the balance of the guides might be made straight—that is, without twisting.

To hold the rod in place a tube, H, is arranged to form a cover for the channel $g$. A tube is used in place of a solid bar on account of its lightness. This tube is secured to arms $h$, that are hinged at $h'$ to the part G in such a manner that any considerable pressure from within the channel will force the tube outward, and if forced beyond the center of gravity would assume the position shown in dotted lines in Fig. 17. One of the arms $h$ has attached an arm, $h^2$, that, when the tube is in position, closing the channel $g$, extends laterally, and has a counter-balance, H', adjustably secured thereon. The sets of rolls are usually about four feet (more or less) apart, and with the bars in the heated condition in which they are passed through the rolls but little force is required to twist the bars a quarter-turn, and usually the weight of the tube H will be more than is required for this purpose; hence the counterbalancing for purposes hereinafter shown.

The one set of rolls must not feed fast enough, as compared with the feed of the preceding set, to stretch the rod, as this would greatly injure, and probably spoil, the rod. To avoid this each set of rolls is speeded so that they will not be likely to take up the rod quite as fast as it is discharged from the preceding rolls, and hence the rods must have room to form "loops," as they are usually called, one of which is shown in Fig. 14, and to allow the loop to bend sidewise in the direction from the frame E.

After each rod has passed through the rolls the operator returns these tubes H to the position, closing the channel $g$ before the next rod is introduced to the rolls.

The tubes, when in the depressed position shown in dotted lines, Fig. 17, are in position to support the loops of the rod, and the tubes being round there is nothing to catch the rod or hinder a free movement of the loop.

The shafts C and C', outside the boxes that are located in the frame E, have, respectively, shoulders $c$ and bearings $c'$ and $c^2$, the former slightly larger in diameter than the latter, and are provided with nuts $c^3$, and with washers or collars $C^2$ and $C^3$. Between these washers or collars, and resting on the bearings $c'$ and $c^2$, are secured, respectively, the reducing-rolls I, that have grooves on their faces of suitable form and size, according to the work to be done.

The rear end of each roller has recesses, in which are inserted nuts $i$, that engage set-screws $i'$, extending through longitudinal holes in the roller, and project far enough in front and through elongated holes in the flange $C^3$ to be operated by a wrench. These set-screws, when the parts are assembled, abut, respectively, against the flange $C^2$. By means of these set-screws the rolls I may be adjusted longitudinally on their respective shafts to make the grooves register accurately; also, the rollers can be backed off of their respective seats by these set-screws when it is desired to remove the rollers.

The shafts C and C' are provided with splines J, and the rollers have corresponding seats, $j$. These splines are usually secured in the respective grooves in the shafts by a screw or otherwise, so that they remain in place when the rolls are removed. The rolls are preferably made of steel, and may be hardened after they are dressed, and thereby rendered durable. Of course the annealing can be done at any time that it is necessary to dress the rolls anew. By this arrangement of parts the rolls are firmly held, can be easily and accurately adjusted to make the grooves of each pair register, and the rolls can be removed and their places supplied by other rolls—as, for instance, when a different size or shape of iron is to be wrought—by stopping the plant only for a few minutes.

What I claim is—

1. In a rolling-mill plant, the combination of a series of overhanging rolls removably mounted on their respective shafts and arranged to form a continuous train, each shaft provided with flanges and nuts for embracing the ends of the rollers and tightening the same, and set-screws for adjusting the rollers lengthwise on the shafts, substantially as set forth.

2. In a rolling-mill plant, the combination, with an overhanging roll removably mounted on a shaft provided with collars for embracing the ends of the roll, and nuts for tightening the collars, the shaft and roll, respectively, provided with one or more splines and engaging-grooves for causing the shaft and roll to revolve together, of set-screws extending longitudinally through the roll and through the outside flange or washer, so as to be operated in front, said set-screws abutting against the rear flange or washer and arranged to adjust the roll lengthwise on the shaft and to back the roll from its seat, substantially as set forth.

3. The combination, with the guide G, provided with a channel, $g$, of the tube H, hinged to the guide, and so arranged that a pressure from within will open the tube outward and open the channel in the guide, substantially as set forth.

4. The combination, with a continuous train of overhanging rolls and guides arranged between the sets of rolls, of brackets secured to the train-frame for supporting the guides, the arrangement of parts being such that the brackets are adjustable vertically or lengthwise of the train, and the guides adjustable laterally, substantially as set forth.

In testimony whereof I sign this specification, in the presence of two witnesses, this 20th day of April, 1885.

CHARLES SCHULZ.

Witnesses:
CHAS. H. DORER,
ALBERT E. LYNCH.